Oct. 8, 1968 K. W. SAMBELL ET AL 3,404,852
TRAILING ROTOR CONVERTIPLANE

Filed Aug. 24, 1966 6 Sheets-Sheet 1

INVENTORS
JOHN A. DeTORE
KENNETH W. SAMBELL
BY
Bean, Brooks, Buckley & Bean
ATTORNEYS

INVENTORS
JOHN A. DeTORE
KENNETH W. SAMBELL
BY
Bean, Brooks, Buckley & Bean
ATTORNEYS

INVENTORS
JOHN A. DeTORE
KENNETH W. SAMBELL
BY
Beau, Brooks, Buckley & Beau
ATTORNEYS United States Patent Office 3,404,852
Patented Oct. 8, 1968

3,404,852
TRAILING ROTOR CONVERTIPLANE
Kenneth W. Sambell and John A. De Tore, Arlington, Tex., assignors to Bell Aerospace Corporation, Wheatfield, N.Y.
Continuation-in-part of application Ser. No. 435,582, Feb. 26, 1965. This application Aug. 24, 1966, Ser. No. 584,030
15 Claims. (Cl. 244—7)

ABSTRACT OF THE DISCLOSURE

An aircraft convertible between fixed wing and helicopter flight modes. The helicopter blade assembly is characterized by a programmed relation between blade pitch and position of the blade assembly during conversion so as to avoid undue stresses on the rotary wing assembly and which minimally affect the aircraft (i.e., as to attitude and speed).

---

This invention relates to aircraft and pertains more particularly to aircraft capable of both fixed and rotary wing flight; this application being a continuation-in-part of our copending application Ser. No. 435,582, filed Feb. 26, 1965, now abandoned.

It is of principal concern in connection with this invention to provide an aircraft which is selectively capable of operation as a rotary wing aircraft characterized by low disc loading, wherein transition to and from rotary wing flight may be made without imposing undue stresses upon the rotary wing assembly. More particularly, transistion as aforesaid is characterized by scheduled or programmed control movements of the rotary wing assembly which minimize stresses upon the rotary wing assembly and which minimally affect the aircraft (i.e., as to attitude and speed) during transition.

As an example of utility, it will be appreciated that low disc loading rotary wing aircraft enjoy the advantage of vertical take-off and landing and of hovering capability combined with good efficiency for these maneuvers as well as good efficiency in level flight; but are somewhat handicapped as to the speed which can be attained in level flight. Conventional fixed wing aircraft, on the other hand, are well known as efficient machines capable of substantial speed in forward flight without, however, the capability of vertical take-off and landing and hovering. Although fixed wing aircraft capable of vertical takeoff and landing and of hovering are known, they tend to be inefficient in these maneuvers, i.e., they are wasteful of fuel and pilot energy. Obviously, then, it would be advantageous selectively to operate an aircraft in fixed and rotary wing modes, the former efficiently to achieve vertical take-off and landing and hovering capabilities and, indeed, such aircraft have been proposed. In such proposals, the rotary wing would be rendered inoperative and stored in some fashion during fixed wing flight. However, the practical problems involved in making the transition from rotary wing to fixed wing flight, and particularly the problems in starting or stopping the rotary wings in flight, are quite substantial and these problems have not, to our knowledge been solved by other machines thus far proposed. To illustrate some of the problems involved, the following requirements for an aircraft of the type described and for conversion between fixed wing and rotary wing fllight are given:

(1) While flying in fixed wing mode, the rotary wing assembly must be folded and stored in such position as to offer minimum drag to allow efficient fixed wing flight.

(2) The change in moments incidental either to storing and folding or unstoring and unfolding of the rotary wing assembly must be substantially minimized to avoid imposing undue control requirements on the pilot.

(3) It should be possible during the transition between fixed wing and rotary wing flight while the rotary wing is unstored to: maintain level fuselage attitude, maintain constant altitude, interrupt or reverse the substantially uniform drag transition process and thereby insure the capability of steady flight at any configuration encountered during the transition process.

(4) The rotary wing lift effect incidental to transition from fixed wing to rotary wing flight should be of smoothly increasing magnitude and should be positive at all times; for transition from rotary wing to fixed wing flight, the lift effect should be of smoothly decreasing magnitude and substantially positive at all times.

(5) No uncontrolled movements of the rotor blades should be permitted during transition between fixed wing and rotary wing flight which might give rise to inordinate stresses in the rotary wing assembly.

It is of primary concern in connection with the present invention to provide an aircraft of the character described which meets all of the above requirements.

More particularly, it is an object of this invention to provide, in an aircraft capable of fixed or rotary wing flight, a rotary wing assembly which is permitted to autorotate during transition between fixed and rotary wing flight and wherein pitch of the rotor blades is coordinated with instantaneous positions of the rotary wing assembly during transition so as to achieve a uniform but minimum drag, smoothly varying lift, and minimization of stresses in the rotary wing assembly during such transition between fixed and rotary wing flight.

Another object of this invention resides in the provision, in an aircraft, of a storable rotary wing assembly which, when stored, offers minimal drag, and which may be moved to operative position in such fashion as to minimize the stresses imposed on such assembly.

Essentially, undesirable stresses and piloting demands arising during movement between stored and operative position of the rotary wing assembly stem from uncontrolled flapwise motions of the blades. Consequently, it is an object of this invention to minimize blade flapping during transition between the stored and operative positions of the rotary wing assembly and, more particularly, it is an object of this invention to control blade flapping by rotating the blades during transition so that the blades will possess sufficient kinetic energy in the plane of blade rotation to resist inordinate flapping.

More particularly, it is an object of this invention to provide an assembly as aforesaid wherein the rotary wing assembly includes a mast movable between a position substantially parallel with the flight path of the aircraft and a position normal thereto, wherein the blades are brought to about one-half operative speed while the mast is in its parallel position.

Another object of this invention resides in the provision of an aircraft of the character described wherein the rotary wing assembly is movable between a position in which its axis of rotation is substantially horizontal (i.e., substantially parallel with the longitudinal axis of the aircraft) and a position in which its axis of rotation is substantially vertical; wherein the blades are movable between trailing (folded) and extended (unfolded) positions while the axis of rotation is horizontal; and wherein scheduled pitch change adjustment of the blades is accomplished during folding and unfolding of the blades and during movement of the axis of rotation as aforesaid. Specifically, unfolding of the blades is accompanied by pitch change from —90° to about —80° to achieve a rotational speed sufficient to minimize flapping caused by asymmetric loading due to gravity (rotational axis horizontal), followed by further pitch change to about −40° to achieve a maximum rotational speed of about half that required for rotor borne flight, whereafter the rotational axis is moved to the vertical position accompanied by further blade-pitch change from about −40° to about 0° whereat the rotational speed is suitable for rotor borne flight and application of power.

Another object of this invention is to coordinate collective and cyclic pitch of the rotor blades of a rotary wing assembly with the instantaneous positions of such blades during transition between fixed and rotary wing flight to achieve smoothness of transition and minimal blade flapping.

Another object of this invention is concerned with the provision of a rotary wing assembly for aircraft wherein such assembly comprises the combination of a pylon, including a rotor, which is pivotally connected to an aircraft for movement between horizontal and vertical positions; a plurality of rotor blades pivotally connected to the rotor for movement through 100° of flapping relative to the rotor mast and for pitch change movements in the order of 110° of motion; and control means coordinating (a) pitch and flapping movements of the blade and (b) pitch of the blades with pivotal movement of the pylon to enable the rotary wing assembly to be moved between operative and inoperative positions while the aircraft with which it is associated is in flight.

Other objects and advantages of the invention will appear from the description hereinbelow and the accompanying drawing wherein.

Figure 1:
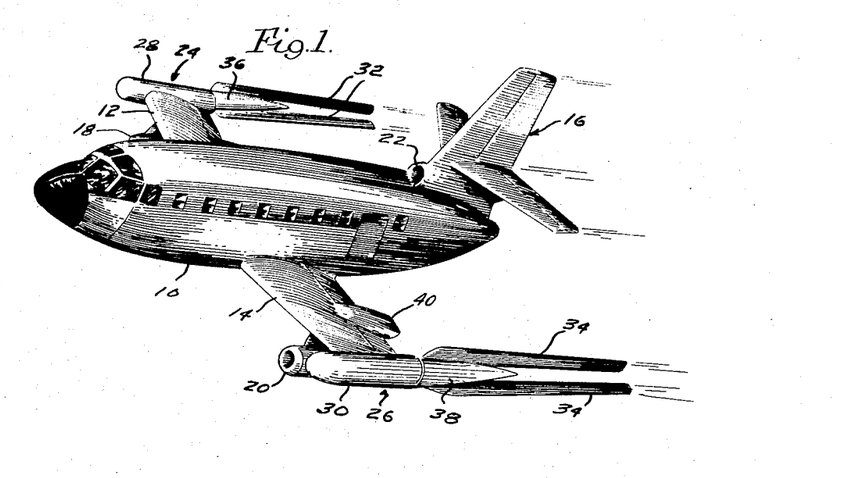
FIG. 1 is a perspective view of an aircraft constructed in accord with this invention and showing the craft in fixed wing flight.
Figure 2:
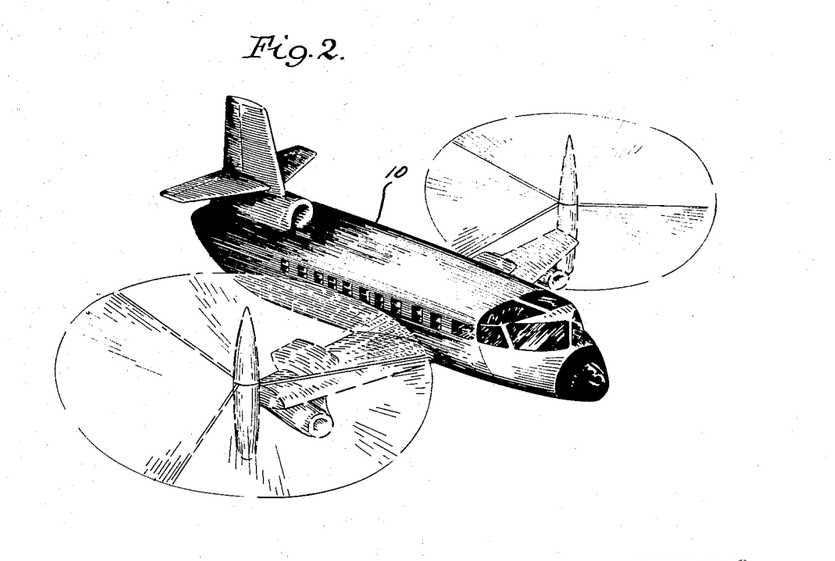
FIG. 2 is a perspective view of the aircraft of FIG. 1 but showing the craft in rotary wing flight.
Figure 3:
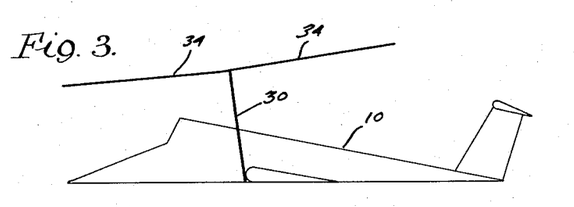
FIGS. 3–7 are diagrammatic views illustrating the disposition of the rotary wing assembly during rotary wing flight (FIG. 3), during transition between fixed and rotary wing flight (FIGS. 4–6) and during fixed wing flight (FIG. 7)

Referring now more particularly to FIGURES 1 and 2, the reference numeral 10 indicates in general an airframe of an aircraft constructed in accordance with the present invention, which airframe includes a fuselage having attached thereto a pair of fixed wings 12 and 14 and a tail assembly or empennage indicated generally by reference character 16 for the purpose of sustaining and controlling the aircraft in fixed wing flight. In the specific embodiment shown, a plurality of jet engines 18, 20 and 22 may be employed whose reaction thrusts are effective to propel the aircraft forwardly for fixed wing flight in the well known manner.

Pivotally attached to the tips of the wings 12 and 14 for movement about axes extending transversely of the aircraft are a pair of rotary wing assemblies 24 and 26 which may include, as shown, body portions 28 and 30 which are pivotally attached to the wings as aforesaid and which house masts or rotor shafts for driving the blades 32 and 34 of the rotary wing assemblies 24 and 26 respectively. To this end, the rotors or masts may be affixed to rotatable housing assemblies 36 and 38 which form, in effect, extensions of the bodies 28 and 30 respectively with the shapes of the bodies 28 and 30 and their corresponding extensions 36 and 38 being contoured to provide good aerodynamic properties particularly while the aircraft is in fixed wing flight mode as is illustrated in FIGURE 1.

Each of the wing-mounted engines 18 and 20 may have auxiliary ducts associated therewith, such as the duct 40 indicated in FIGURE 1 and suitable diverting means may be associated with each of these engines to divert the products of combustion therefrom selectively through these ducts so that turbine assemblies disposed within the duct mechanism may be driven to impart rotary motion to the housings 36 and 38 and blades associated therewith. When the power assembly of the aircraft is thus diverted, it will be appreciated that the propelling thrusts of the engines 18 and 20 for fixed wing flight will be terminated and all of their power will be diverted for utilization to rotate the blades of the rotor assemblies 24 and 26. It will be understood, however, that this particular manner of powering the aircraft in forward flight and in rotary wing flight may be accomplished in any desired manner. For example, separate engines may be employed for the two purposes or any other arrangement can be made as may be deemed desirable or necessary.

Figure 6:
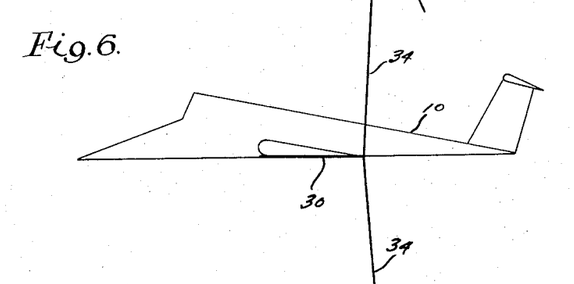
Figure 7:
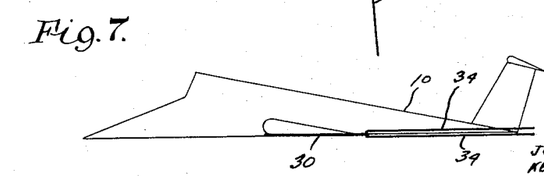

In what follows, conventional terminology in the helicopter art will be employed particularly as regards motion of the blades 32 and 34 relative to their rotors or driving masts. Thus, flapping motion of the blades 32 and 34 refers to motion about an axis adjacent the root ends of the blades which extends chordwise of the associated blade (i.e., whereby the blades are movable between positions as shown in FIGURES 6 and 7). Pitch motion of the blades refers to pivotal motion of the blades about axes extending longitudinally thereof to thereby alter the angle of attach of the individual blades as they are rotated during rotary wing flight. Moreover, the blade pitch change is termed positive when it produces a positive change in lift on the aircraft as the blades are rotated with the mast essentially vertical and pitch change is designated as negative when the blades produce a negative change in lift on the aircraft. Zero blade pitch is defined as the blade chord in the plane of rotor rotation.

In the fixed wing flight mode as is illustrated in FIGURE 1, the pylons 28 and 30 are disposed in substantially horizontal positions and the blades 32 and 34 are disposed in trailing positions. Moreover, the blades are disposed relative to their flapping axes in positions displaced about 90° from the positions which they assume during operative disposition thereof as in rotary wing flight illustrated in FIGURE 2. Additionally, the blades, in FIGURE 1, are disposed in positions of −90° pitch. In this trailing position, the rotary wing assemblies 24 and 26 will offer a minimum of drag during fixed wing flight and the aircraft is therefore capable of substantial forward speeds far in excess of the forward speeds which could be obtained by rotary wing flight mode operation alone. When it is desired to make the transition between fixed wing flight and the rotary wing flight, the blades 32 and 34 are first unfolded about their flapping axes through an angle of 90° while the pylons 28 and 30 remain horizontal and during which time the pitch of the blades 32 and 34 is increased from −90° to about −80°. As a result, the rotary wing assemblies are autorotated from standstill to a speed which is sufficiently high to minimize flapping due to gravity. A further pitch input increases the pitch to −40°. As a result, the rotary wing assemblies are autorotatively accelerated to a speed which is substantially half the speed at which the blades will ultimately be rotated, with power, to effect forward flight, hovering and vertical take-off and landing capabilities. With the rotor blades now in this position, the pylons 28 and 30 are rotated about their axes ultimately to be disposed substantially vertically and during this time, the pitch of the blades 32 and 34 is coordinated therewith to bring the rotational speed of the blades up to or substantially up to operating speed. In other words, the rotational speed of the blades is substantially doubled during the time at which the pylons 28 and 30 are moved from horizontal to vertical positions. Furthermore, during this transitional period, no power need be applied to the rotary wing assemblies.

Figure 4:
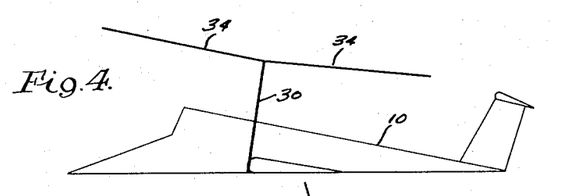

Bearing the above in mind and having reference to FIGURES 3–7 inclusive, it will appear that the above procedure for transition between fixed and rotary wing flight is simply reversed for transition between rotary wing flight and fixed wing flight. Thus, in FIGURE 3, wherein the aircraft is shown in rotary wing flight, the mast 30 is substantially vertical or, as shown, slightly past vertical and blades 34 are being driven by suitable power plants at the requisite r.p.m. consonant with helicopter flight whereas the pylon 30 is converted aft to the substantially vertical position as shown in FIGURE 4. The supply of shaft horsepower is then interrupted and the controls are moved in order for the rotors to begin autorotating at a substantially unchanged tip speed. Pylon conversion may then be continued or it may be one smooth continuous movement from the original position.

Figure 5:
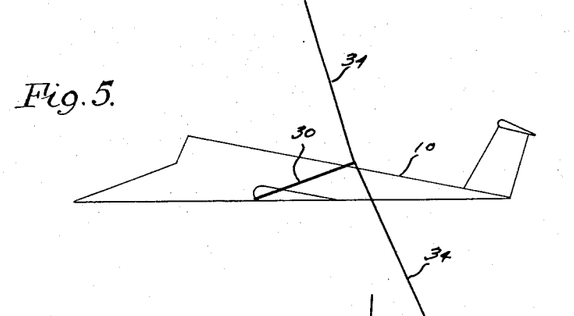

In the position of FIGURE 4, the aircraft is flying under the power of the forward propelling means associated therewith with the blades 34 autorotating substantially at full speed and the rotary wing assembly is imparting to the aircraft substantially all the lift required to maintain the aircraft in fixed altitude. As the mast 30 is moved rearwardly as shown in FIGURE 5, the pitch of the blades 34 is gradually increased negatively so that the autorotational speed of the blades 34 will decrease as the pylon 30 is moved aft so that when the pylon 30 is substantially horizontal as is shown in FIGURE 6, the autorotational speed of the blades 34 will be substantially one-half of the operating speed effected in FIGURE 3. Next the pitch is further decreased to about —80°. The tip speed will be gradually reduced to a "folding" tip speed which is about 5–10% of the aforesaid operative tip speed. Next, the blades are moved about their flapping axes until they are ultimately disposed in the trailing position shown in FIGURE 7 and during this time, the negative pitch of the blades is further decreased until they are at —90° pitch whereat autorotation of the blades will cease.

Figure 8:
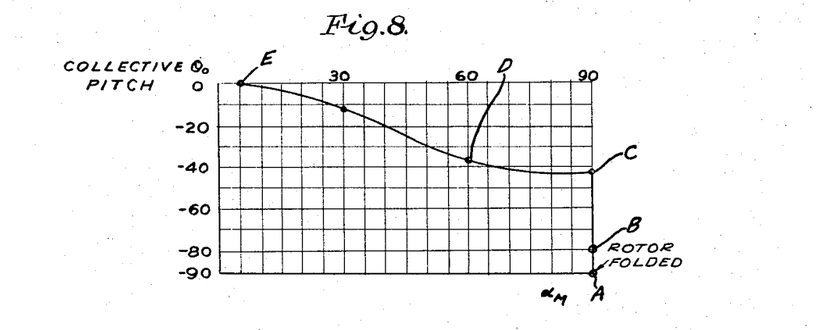
FIG. 8 is a graph relating collective pitch of the rotor blades to angular disposition of the pylon or mast.
Figure 9:
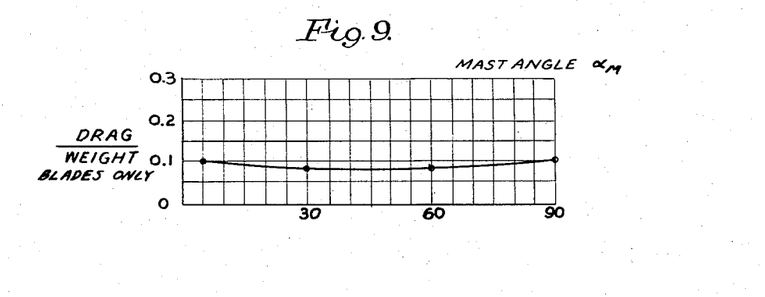
FIG. 9 is a graph illustrating the drag due to the rotor blades during transition.
Figure 10:
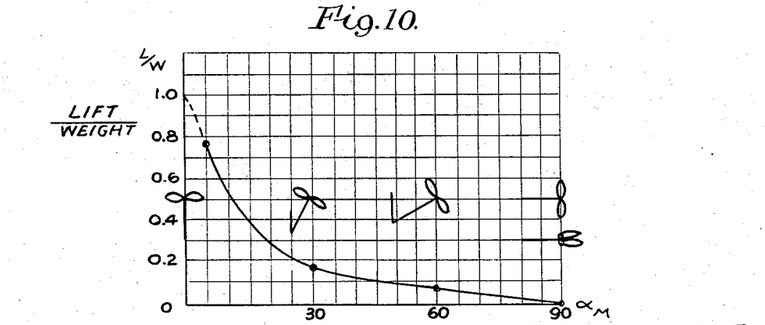
FIG. 10 is a graph illustrating the lift characteristics of the rotary wing assembly during transition.

To appreciate the advantages inherent in the coordinated blade and pylon movements as set forth above, reference is made now to FIGURES 8–10. FIGURE 8 illustrates, at point A, the disposition of the blades according to FIGURES 1 and 7. As the blades are unfolded about their flapping axes the pitch of the blades is increased until, at B corresponding to FIGURE 6, the pitch of the blades is at about —80° and the rotational speed of the rotors is about 5–10% of the operational speed thereof. Next the blade pitch is gradually increased to about—43° and the rotational speed is gradually accelerated to about one-half of the aforesaid operational tip speed. This condition is at point C and still corresponds to FIGURE 6. Then, as the mast is pivoted towards its upright position, the collective pitch of the blades is further increased until, at point E corresponding to the disposition of the blades in FIGURE 4, the blades have zero collective pitch imparted thereto and the autorotational speed of the blades is substantially at the operational speed thereof. At this point, power is applied to the rotor assembly and the mast is further tilted towards or even beyond the vertical position and the pitch of the blades is controlled by the pilot.

To appreciate the effect of the above, it will be seen from FIGURE 9 that the drag effect of the rotary wing assembly during transition is substantially uniform, an effect which is highly important with respect to successful operation of an aircraft of this type. That is to say, the drag imparted by the rotary wing assembly during the mast tilting process will be essentially constant.

FIGURE 10 illustrates further the smoothness of the transition according to the present invention. In this figure, it will be seen that no sudden or unexpected variations in lift effect by the rotary wing assembly occurs during transition and the pilot of the aircraft is therefore easily able to compensate for the smoothly varying lift effect during transitional flight.

Figures 11, 12:
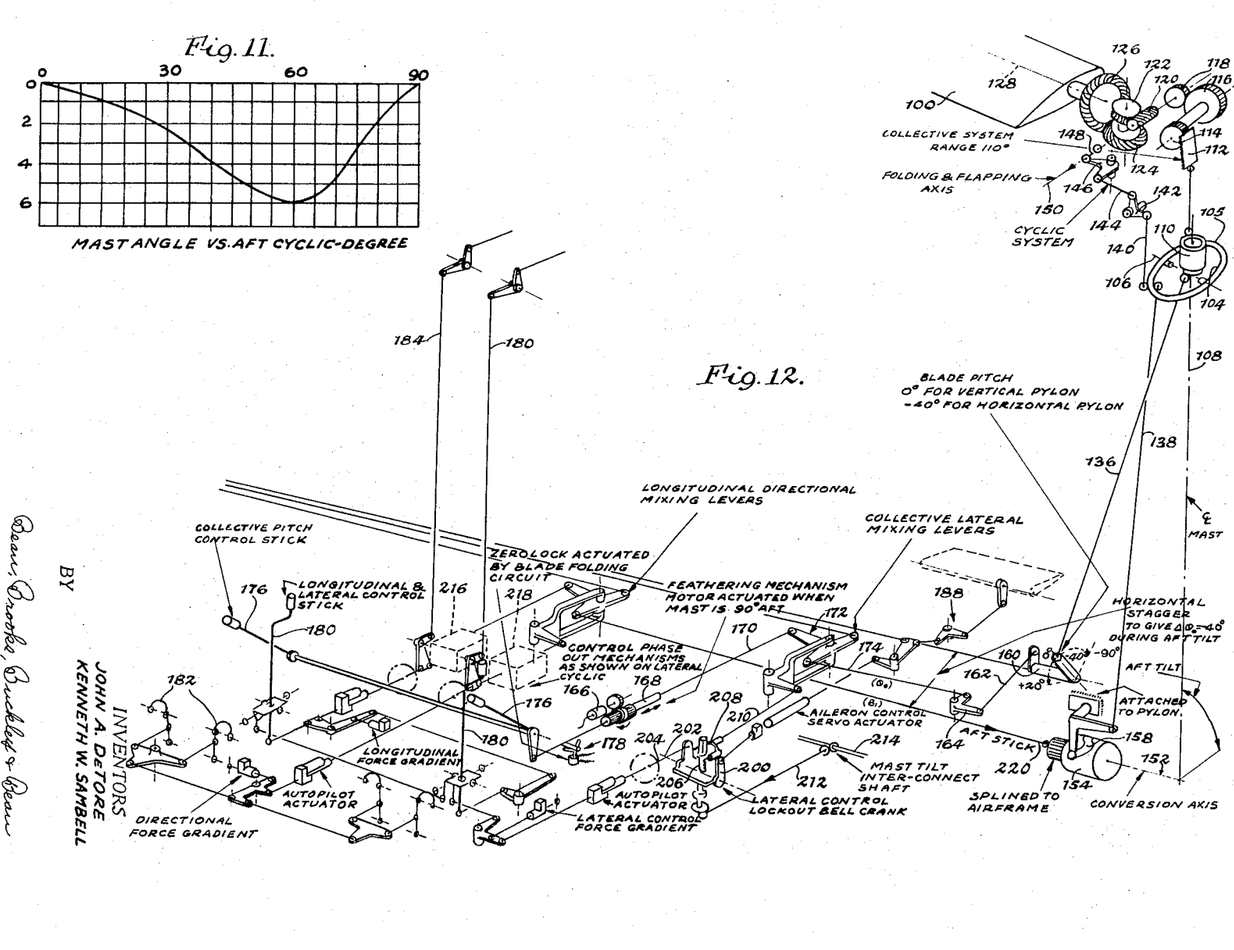
FIG. 11 is a graph relating cyclic pitch of the rotor blades to angular disposition of the pylon or mast.
FIG. 12 is a diagrammatic view illustrating a system according to the invention.

It will be appreciated that FIGURE 8 represents collective pitch imparted to the several blades of each rotary blade assembly. In other words, FIGURE 8 refers to the pitch characteristics which are simultaneously imparted to all of the blades. In addition to collective pitch control during transitional flight, it has been found that it is desirable to apply cyclic pitch during pylon conversion in order to keep flapping angles small and to obtain the optimum combination of force parameters. The requirement is shown in FIGURE 11. The control movement required is fairly smooth and leaves ample cyclic pitch in reserve; it reaches a maximum of about 6° aft at a mast angle of 60° corresponding to point D of FIGURE 8 and the rotor position is as shown schematiccaly in FIGURE 5. The penalties for an off-optimum combination of cyclic pitch, collective pitch, and mast angle are small and simply result in a reasonable degree of blade flapping which can be accommodated by the flapping hinge of the blades.

Any excessive degree of blade flapping will impose undue stresses upon the rotary wing assembly and for this reason alone, flapping must be controlled. In order to achieve this result, the inherent tendency of a rotating blade to resist flapping is used. When the mast is horizontal or parallel to the air stream, little if any tendency to flapping is encountered. However, as the mast, with blades extended, is moved between the horizontal and the vertical positions, the tendency for the blade to flap is substantial. Thus, the blades are rotated at such a speed, when the mast is horizontal, that proportionately greater speeds may be easily attained at intermediate positions of the mast to compensate for flapping tendencies throughout the transition period. It is to be noted, with regard to the rotational speed of the blades, that such speed may be attained purely by autorotation or by a combination of autorotation and applied power.

The controls for one rotor 100 on one of the masts is illustrated in FIGURE 12. The swash plate assembly 104 is utilized to achieve cyclic pitch controls, the plate 104 being mounted for rocking about the axis 106. For collective pitch control, a sleeve 110 is mounted for axial movement along the axis 108 of the mast for imparting collective axial movement to a suitable rack mechanism 112 substantially as is shown. The rack 112 actuates a pinion 114 connected to a further gear 116 meshing with the pinion 118 connected by a splined shaft to the worm 120. The worm 120 rotates with the pinion 118 and is also axially movable toward and away therefrom. Rotation of the pinion 118 and of the worm 120 operates through the worm wheel 122 to rotate the bevel gear 124 meshing with a mating bevel gear 126 rigid with the rotor 100 and having its axis coincidental with the pitch change axis 128 of the rotor blade.

A link 136 is pivotally connected to the plate 104 for rocking it about axis 106 whereas a link 138 is pivotally connected to the sleeve 110. Thus, the link 136 functions to produce collective pitch while link 138 produces cyclic pitch. A ring 105 is journalled on the plate 104 and is connected by link 140 to the bell crank lever 142 connected through a link 144 to a further bell crank 146 having a link connection as at 148 to the worm 120 for imparting axial movement of the worm toward and away from the pinion 118. It is to be noted that the shaft connected to the pinion 118 and to which the worm 120 is splined for axial movement therealong and for rotation therewith is located coincidental with the axis 150 about which folding and flapping motion of the blades occur.

The axis about which the mast or pylon tilts during conversion is indicated by the reference character 152 and it will be noted that a cyclic pitch cam 154 is located on this axis so that when the pylon is tilted, the bell crank 156 will operate within the cam track 158 to impart the proper cyclic pitch control, through the link 138 to achieve the effect illustrated in FIGURE 11. A bell crank assembly 160 is secured to the airframe and is connected through a link 162 to the control crank 164 located on the airframe, the crank assembly 160 being offset horizontally from the conversion axis 152 so that if the blades are at 0° for the mast vertical, when the mast is tilted aft (90°) the rotor blades 100 will automatically be disposed at —40° pitch angle corresponding to point C in FIGURE 8.

Between blade pitch angles of —40° and —80°, a suitable motor 166 driving an extensible worm 168 connected by a link 170 to the mixing lever assembly 172 and thereafter through the link 174 to the bell crank 164 is operated to achieve the desired pitch change of the rotor blades 100. Between this pitch angle of the rotor blades 128 and the fully folded position thereof whereat they are at —90° pitch, the connection between the worm 120 and the worm wheel 122 effects collective pitch change automatically as the blades are moved about their folding axis 150. The link 170 is also controlled by the collective pitch control sticks 176 but upon actuation of the blade folding mechanism, the collective pitch control sticks are rendered ineffective by means of the lockout mechanism 178 which is so located as to permit actuation of the automatic feathering mechanism 166, 168 when the lockout mechanism is operative.

Longitudinal, lateral and directional control are achieved by the sticks 180 and by rudder pedals 182. In the helicopter flight mode, movement of the pilot controls may actuate both the blade pitch controls and also the elevator rudder and aileron controls 184, 186 and 188 respectively. In airplane mode, the blades are locked into the supports 38 of FIGURE 1 and the coupling ratios between the pilot controls and the blade pitch are reduced to zero. One way in which a typical control function may be phased in and out is illustrated in FIGURE 12. As shown, a yoke assembly 200 is mounted for rocking about the axis 202, motion of this mechanism being imparted thereto by a suitable link such as that indicated by the reference character 204. A screw thread member 206 is engaged with the yoke 200 and carries a clevis yoke member 208 connected to the control link 210. Upon rotation of the screw thread member 206, the clevis member 208 is moved to or away from a position of coincidence with the axis 202. When the clevis 208 is on the axis 202, no motion will be imparted to the link 210 whereas when the clevis is displaced as is shown in FIGURE 12, motion will be imparted to the link 210 for actuating the mixing lever assembly 172. Motion of the screw thread member 206 to effect this position change of the clevis 208 is effected by means of a suitable drive connection 212 thereto operated from a power shaft 214 which may be coordinated with the mast tilting mechanism. Similar mechanisms are employed in the dashed line boxes indicated by reference characters 216 and 218.

Mast tilting and rotor blade folding, taking place about the axes 152 and 150 respectively are achieved by any suitable mechanism and the requisite pitch change motions of the rotor blades 100 are effected incidental thereto. For example, as has been previously mentioned, the placement of the bell crank 160 achieves automatic pitch change motion of the blades 100 from zero pitch to —40° incidental to conversion of the mast to its trailing position. At the same time, the cam mechanism 154 achieves the cyclic pitch change depicted in FIGURE 11. That is to say, aft tilting of the mast effects collective pitch change as shown in FIGURE 8 from point E to point C through the medium of the disposition of the bell crank 160 whereas the cyclic pitch change shown in FIGURE 11 is effected by the cam 154.

It will be noted that the cam 154 is non-rotatably fixed to the airframe but is slidable along the axis 152 to permit the link 220 to operate the cyclic pitch mechanism under the pilot's control. The motor 166 operates the collective pitch of the blades between points B and C in FIGURE 8 and the connection between the worm 120 and the worm wheel 122 effects collective pitch change of the blades between the points A and B in FIGURE 8 automatically as the blades 100 are moved about their folding axes 150.

Figure 13:
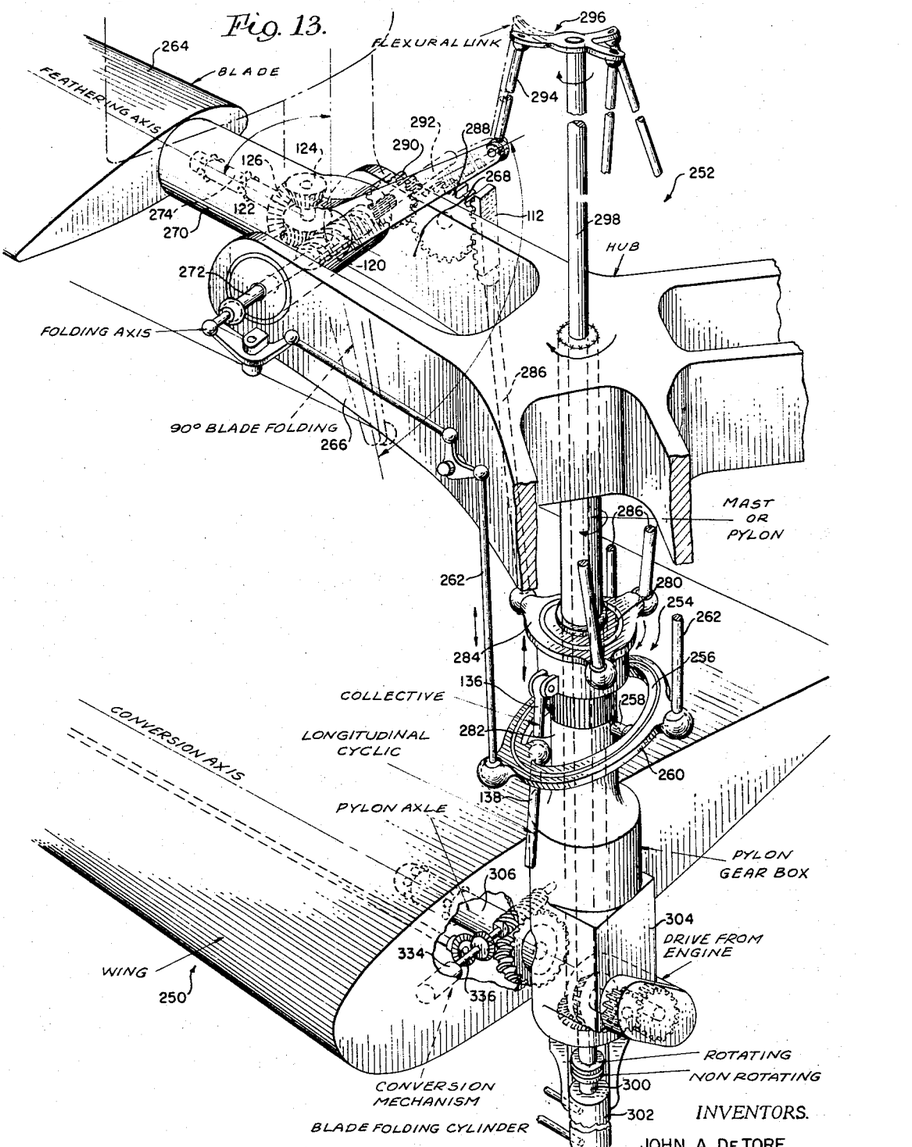
FIG. 13 is a perspective view, partly in section, illustrating details of the system illustrated in FIG. 12.
Figures 14, 15:
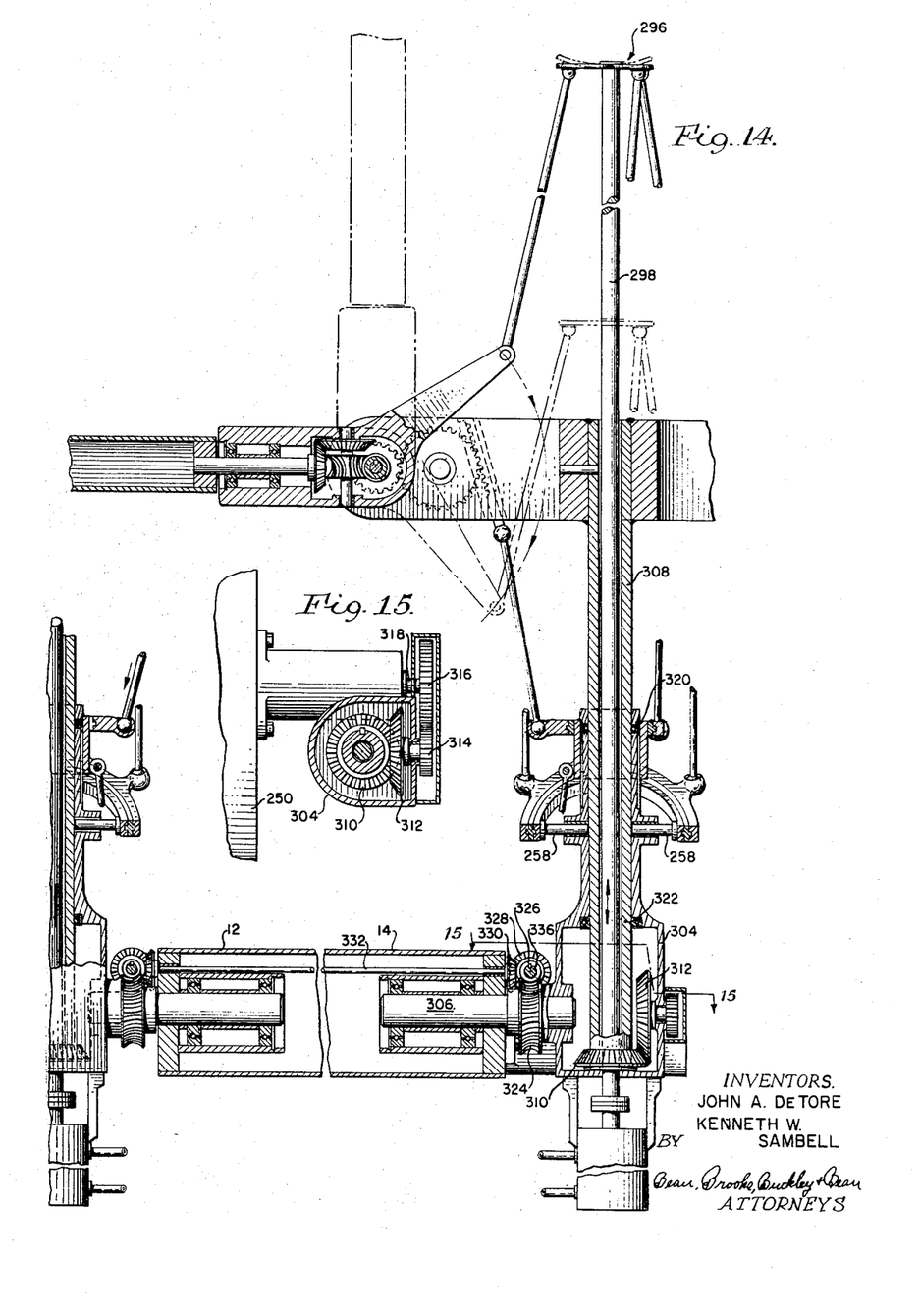
FIG. 14 is a vertical section taken through the conversion axis of the embodiment shown in FIG. 13.
FIG. 15 is a horizontal section as indicated generally by section line 15—15 in FIG. 14.

A specific form of the invention is illustrated in FIGURES 13–15. In FIGURE 13, one wing of the aircraft is indicated generally by the reference character 250 whereas the pylon assembly is indicated generally by the reference character 252. To correlate FIGURE 13 with FIGURE 12, the collective and cyclic pitch control rods indicated by lines 136 and 138 in FIGURE 12 are likewise indicated by these reference characters in FIGURE 13. The cyclic swash plate is indicated by the reference character 254 and its gimbal ring 256 is shown to be connected to the cyclic control rod 138 about the axis defined by the gimbal trunnions 258. The outer ring 260 which rotates upon the inner ring 256 is connected at circumferential equidistantly spaced points thereon to the cyclic control transmitting rods 262 provided for the individual rotor blades of the hub assembly. In the specific instance shown there are three blades associated with the hub, one of which is shown partially as indicated by the reference character 264.

The hub is provided with a pair of spaced arms 266 and 268 for each rotor blade and the blade mounting member 270 is journalled between such arms for movement about the folding axis. A worm shaft 272 is coincidental with the folding axis and is mounted for axial displacement under control of the respective rods 262 and through the illustrated bell cranks and connecting link assemblages shown to impart, by means of the axial displacement of the worm shaft 272, the cyclic pitch adjustments to the respective rotor blades 264.

This mechanism is identical with that previously described in FIGURE 12 and corresponding parts are indicated by like reference numerals in the two figures, it being appreciated that the member 270 rotatably receives the shaft 274 to which the blades 264 is attached and which is also fixed to the gear 126.

The collective pitch mechanism involves an inner spool 280 splined to the pylon housing 282 and to which the collective pitch control rod 136 is pivotally connected as shown. The outer ring 284 is rotatably carried by the spool 280 and mounts pivotally thereon the several collective pitch transmitting rods 286. The previously described racks 112 are associated with respective ones of these rods 286 and each rack meshes with its gear 288 intermediate the rack and the spur gear 290 for imparting rotation to the worm 120, all as has been previously described.

The housings 270 are each provided with an arm 292 coupled as by the links 294 to a flexure link assembly indicated by the reference character 296. This link 296 is fixed to the upper end of a folding control rod 298 which extends concentrically within the pylon assembly to project from the lower end thereof and is coupled for axial displacement but with relative rotation to the shaft 300 of a suitable motor 302 serving to impart relatively opposite axial displacements to the shaft 298 and to consequently effect folding of the blades about their respective folding axes.

The lower end of the pylon terminates in a gear box or housing 304 which is rotatably mounted on the wing by means of a pylon axle 306. As is shown best in FIGURE 14, drive is imparted to the mast 308 by means of a pair of bevel gears 310 and 312 coupled, by means of the gears 314 and 316 (see FIGURE 15), to the shaft 318 having connection to and driven by the power plant or power plants for the aircraft. The mast 308, then, rotates within the pylon gear box assembly and is suitably supported as for example by bearings 320 and 322. The pylon axles 306 mount worm wheels 324 engaged by the worms 326 which are driven by the bevel gear set 328 and 330 operatively associated with the coupling shaft 332. Thus, the two rotor assemblies operate in unison as is clearly shown in FIGURE 14. A suitable motor 334 (see FIGURE 13) operates to rotate the worm shaft 336. Otherwise, the assembly is identical with the description in conjunction with FIGURE 12. That is to say, a suitable cam mechanism 154 operates on the lower end of the cyclic control rod 138 through the bell crank mechanism 156 and similarly as is shown in FIGURE 12 for the collective control rod 136.

It is to be understood that certain changes and modifications as illustrated and described may be made without departing from the spirit of the invention or the scope of the following claims.

We claim:
1. In an aircraft, in combination,
   an airframe,
   a rotatable mast pivotally carried by said airframe for movement between substantially horizontal and substantially vertical positions,
   a rotary wing assembly carried by said mast, said assembly including a hub fixed to said mast for rotation therewith, and a blade pivotally mounted on said hub for flapping and pitch change motions relative thereto,
   first control means for moving said blade about its flapping axis between a folded position substantially parallel with the axis of rotation of said mast and an operative position substantially normal thereto,
   second control means for moving said blade about its pitch change axis.
   third control means for moving said mast between its substantially horizontal and substantially vertical positions,
   and means interconnecting said first, said second and said third control means for controlling the speed of said blade in autorotation as the blade is moved between its folded and operative positions and as the mast is moved between its substantially horizontal and substantially vertical positions.

2. In an aircraft, in combination,
   an airframe,
   a rotatable mast pivotally carried by said airframe for movement between substantially horizontal and substantially vertical positions,
   a rotary wing assembly carried by said mast, said assembly including a hub fixed to said mast for rotation therewith, and a blade pivotally carried by said mast for flapping and pitch change movements relative thereto,
   first control means for moving said blade about its pitch change axis,
   second control means for moving said blade about its flapping axis between a folded position substantially parallel with said mast and an operative position substantially normal thereto,
   third control means for moving said mast between its substantially horizontal and substantially vertical positions,
   means actuated in response to operation of said second control means for varying the pitch of said blade as the same is moved about its flapping axis, between its folded and operative positions, with said mast in its substantially horizontal position to autorotate said mast and said blade up to a predetermined speed,
   and means actuated in response to operation of said third control means for varying the pitch of said blade as the mast is moved toward its substantially vertical position to increase the autorotational speed of said mast and rotary wing assembly beyond said predetermined speed.

3. An aircraft comprising, in combination,
   a fuselage having a fixed wing and means for propelling the fuselage for sustaining lift by said wing,
   and a rotary wing assembly for supplanting the sustaining effect of the combination of said fixed wing and associated means, said assembly including a mast pivotally connected to said fuselage for movement between a substantially horizontal position and a generally upright position, a hub fixed to said mast, a plurality of blades pivotally carried by said hub for (a) folding movement between trailing, generally parallel attitudes relative to said mast and unfolded positions generally normal to said mast, and (b) rotation generally about their longitudinal axis for effective pitch change motion relative to said mast, means for moving said blades between their folded and unfolded positions, means for varying the pitch of said blades in response to and as they are moved to unfolded position with said mast substantially horizontal to such a degree as to progressively achieve a predetermined autorotational speed thereof, means for moving said mast between its stated positions, and means for varying the pitch of said blades progressively to increase the autorotative speed thereof to an operative speed greater than said predetermined speed in response to and as said mast is moved toward its substantially upright position.

4. The combination as defined in claim 3 wherein said predetermined speed is approximately half of said operative speed.

5. The combination as defined in claim 3 wherein the last-mentioned means imparts both collective and cyclic pitch changes to said blades.

6. An aircraft comprising, in combination,
   an airframe including a fixed wing and propulsion means for obtaining forward speed of the aircraft and accompanying sustaining lift by said wing,
   a rotary wing assembly carried by said airframe for supplanting the sustaining effect of said propulsion means and fixed wing, said assembly including a mast pivotally carried by said airframe for movement between substantially horizontal and substantially upright positions, a plurality of blades pivotally carried by said mast for movement between folded and unfolded positions relative thereto and for pitch change movement, means for folding and unfolding said blades, means for moving said mast between its substantially horizontal and upright positions, means for effecting pitch change movement of said blades, and means connecting said means for moving the mast and said means for effecting pitch change movement of the blades to vary the pitch of said blades as the mast is moved to its upright position while substantially continuously maintaining an uplifting effect thereby to said fuselage.

7. An aircraft comprising, in combination,
   an airframe including a fixed wing and propulsion means for obtaining forward speed of the aircraft and accompanying sustained lift by said wing,
   a rotary wing assembly carried by said airframe for supplanting the sustaining effect of said propulsion means and fixed wing, said assembly including a mast pivotally carried by said airframe for movement between substantially horizontal and substantially upright positions, a plurality of blades pivotally carried by said mast for movement between folded and unfolded positions relative thereto, means for varying the pitch of said blades, and means for moving said mast between its substantially horizontal and substantially upright positions,
   means for unfolding said blades and changing the pitch thereof while said mast is in its substantially horizontal position to impart progressively greater autorotational speed of the blades,
   and means connecting said means for varying the pitch of the blades and said means for moving the mast for further changing the pitch of said blades and simultaneously moving said mast toward its upright position to further increase autorotational speed of said blades.

8. An aircraft comprising, in combination,
an airframe including a fixed wing capable of sustaining the aircraft,
a rotary wing assembly for selectively supplanting the sustaining effect of said fixed wing, said assembly including a mast pivotally connected to said airframe for movement between a stored position substantially parallel to the longitudinal axis of the aircraft and an operative position substantially normal to such axis, a blade pivotally connected to said mast for movement of said blade between a stored position substantially parallel to said mast and an operative position substantially normal to said mast, and means for converting said mast and said blade from their stored to their operative positions,
and means for causing said blade, during the aforesaid transition, to vary in rotational speed between rest and a speed substantially capable of sustaining the aircraft when both mast and blade are in operative positions, the last mentioned means including mechanism for moving said mast between its stored and operative positions, mechanism for varying the pitch of said blades, and means connecting said mechanisms to vary the pitch of said blade as the mast is moved between its stated positions.

9. In an aircraft, in combination,
an airframe,
a rotatable mast pivotally carried by said airframe for movement between substantially horizontal and substantially vertical positions,
a rotary wing assembly carried by said mast, said assembly including a hub fixed to said mast for rotation therewith, and a blade pivotally mounted on said hub for flapping and pitch change motions relative thereto,
first control means for moving said blade about its flapping axis between a folded position substantially parallel with the axis of rotation of said mast and an operative position substantially normal thereto,
second control means for moving said blade about its pitch change axis,
third control means for moving said mast between its substantially horizontal and substantially vertical positions,
means interconnecting said first and said second control means for rotating said blade, while said mast is substantially horizontal, from standstill to a speed substantially one-half of that required for rotor-borne flight when the blade is in operative position with said mast substantially vertical,
and means interconnecting said second and said third control means for increasing the speed of rotation of said blade substantially to that required for rotor-borne flight as aforesaid as the mast is moved to its substantially vertical position.

10. In an aircraft, in combination,
an airframe,
a rotatable mast pivotally carried by said airframe for movement between substantially horizontal and substantially vertical positions,
a rotary wing assembly carried by said mast, said assembly including a hub fixed to said mast for rotation therewith, and a blade pivotally carried by said mast for flapping and pitch change movements relative thereto,
propulsion means for selectively powering said rotary wing assembly,
first control means for moving said blade about its pitch change axis,
second control means for moving said blade about its flapping axis between a folded position substantially parallel with said mast and an operative position substantially normal thereto,
third control means for moving said mast between its substantially horizontal and substantially vertical positions,
means actuated in response to operation of said second control means for varying the pitch of said blade as the same is moved about its flapping axis, between its folded and operative positions, with said mast in its substantially horizontal position to autorotate said mast and said blade up to a predetermined speed,
means actuated in response to operation of said third control means for varying the pitch of said blade as the mast is moved toward its substantially vertical position to increase the autorotational speed of said mast and rotary wing assembly beyond said predetermined speed,
and means for powering said rotary wing assembly from said propulsion means when said mast is substantially vertical.

11. An aircraft comprising, in combination,
an airframe,
a rotary wing assembly including a rotary mast pivoted to said airframe for movement between a position substantially parallel with the longitudinal axis of said airframe and a position substantially normal to such axis, blade means pivotally connected to said mast for movement between a position substantially parallel with the mast and a position substantially normal to the mast,
means for moving said mast between its stated positions,
means for moving said blade means between its stated positions,
said blade means having a predetermined speed of rotation when the mast is substantially vertical and the blade means is substantially normal thereto capable of sustaining the aircraft at fixed elevation relative to the ground,
control means for rotating said blade means at substantially one-half said predetermined speed with said blade means substantially normal to said mast and with said mast substantially parallel with the longitudinal axis of said aircraft,
and control means for increasing the rotational speed of said blade means to said predetermined speed in response to and as the mast is moved to its position substantially normal to the longitudinal axis of said aircraft.

12. In an aircraft, in combination,
an airframe,
a rotatable mast pivotally carried by said airframe for movement between substantially horizontal and substantially vertical positions,
a rotary wing assembly carried by said mast, said assembly including a hub fixed to said mast for rotation therewith, and a blade pivotally mounted on said hub for flapping and pitch change motions relative thereto,
first control means for moving said blade about its flapping axis between a folded position substantially parallel with the axis of rotation of said mast and an operative position substantially normal thereto,
second control means for moving said blade about its pitch change axis,
third control means for moving said mast between its substantially horizontal and substantially vertical positions,
means interconnecting said first and second control means for rotating said blade, while said mast is substantially horizontal, from standstill to a speed substantially one-half of that required for rotor-borne flight when the blade is in operative position with said mast substantially vertical, and means interconnecting said second and third control means for increasing the speed of rotation of said blade substantially to that required for rotor-borne flight as aforesaid.

13. An aircraft comprising, in combination, an airframe including a fixed wing capable of sustaining the aircraft in flight, a rotary wing assembly for selectively supplanting the sustaining effect of said fixed wing, said assembly including a mast pivotally connected to said airframe for movement between a stored position substantially parallel to the longitudinal axis of the aircraft and an operative position substantially normal to such axis, a blade pivotally connected to said mast for movement of said blade between a stored position substantially parallel to said mast and an operative position substantially normal to said mast, means for varying the pitch of said blade, and means for converting said mast and said blade between their stored and their operative positions, and means connecting said means for varying the pitch of the blade and the converting means for controlling rotation of said blade, during conversion as aforesaid, to minimize flapping motions of said blade.

14. The combination as defined in claim 13 wherein the last-mentioned means imparts both collective and cyclic pitch changes to said blades.

15. An aircraft comprising, in combination, an airframe including a fixed wing and propulsion means for obtaining forward speed of the aircraft and accompanying sustaining lift by said wing, a rotary wing assembly carried by said airframe for supplanting the sustaining effect of said propulsion means and fixed wing, said assembly including a mast pivotally carried by said airframe for movement between substantially horizontal and substantially upright positions, a plurality of blades pivotally carried by said mast for movement between folded and unfolded positions relative thereto, means for varying the pitch of said blades and means for unfolding said blades and moving said mast to its substantially upright position, and means connecting said means for varying the pitch of the blades and the unfolding means for controlling rotation of said blades to minimize flapping motions of said blades.

References Cited

UNITED STATES PATENTS 2,743,071   4/1956   Kelly     244—17.13
3,185,408   5/1965   Higgins     244—7

OTHER REFERENCES

Aviation Week & Space Technology, Dec. 28, 1964, pp. 44, 45.

MILTON BUCHLER, *Primary Examiner.*

T. W. BUCKMAN, *Assistant Examiner.*